United States Patent
Oyama

[11] 3,892,211
[45] July 1, 1975

[54] FUEL-AIR MIXTURE HEATING DEVICE FOR INTERNAL COMBUSTION ENGINES

[75] Inventor: Yoshishige Oyama, Hitachi, Japan
[73] Assignee: Hitachi, Ltd., Japan
[22] Filed: Dec. 13, 1972
[21] Appl. No.: 314,500

[52] U.S. Cl......... 123/122 R; 123/133; 123/122 A; 123/122 H
[51] Int. Cl............................................ F02m 31/00
[58] Field of Search.... 123/133, 122 R, 141, 122 A, 123/122 C, 122 H

[56] References Cited
UNITED STATES PATENTS

| | | | |
|---|---|---|---|
| 1,813,406 | 7/1931 | Kirstatter | 123/133 |
| 1,938,252 | 12/1933 | Hamacheck | 123/122 A |
| 2,119,885 | 6/1938 | Moore | 123/122 R |
| 2,458,826 | 1/1949 | Blumberg | 123/122 R |
| 3,273,161 | 9/1966 | Giorgio | 123/122 R |

FOREIGN PATENTS OR APPLICATIONS

| | | | |
|---|---|---|---|
| 120,487 | 10/1942 | Australia | 123/122 R |
| 270,924 | 5/1927 | United Kingdom | 123/122 A |
| 106,595 | 2/1943 | Germany | 123/122 A |

Primary Examiner—Charles J. Myhre
Assistant Examiner—R. H. Lazarus
Attorney, Agent, or Firm—Craig & Antonelli

[57] ABSTRACT

A fuel-air mixture heating device is described which is interposed between a carburetor and an intake manifold so that completely vaporized fuel may be injected into the cylinders of the engine without adversely affecting the charging efficiency. The fuel-air mixture flowing from the carburetor to the intake manifold is forced to pass through a heating means where even low-volatile components of the fuel may be heated and completely vaporized, then through a flow controlling means for restricting the flow of the low-volatile components of the fuel close to the axis of the intake manifold while forcing the high-volatile components to flow off the axis, and finally through cooling means for cooling the fuel-air mixture before it is injected into the cylinder.

13 Claims, 3 Drawing Figures

FUEL-AIR MIXTURE HEATING DEVICE FOR INTERNAL COMBUSTION ENGINES

BACKGROUND OF THE INVENTION

The present invention relates to a fuel-air mixture heating device for use with an internal combustion engine.

In order to reduce the pollutants contained in the exhaust gases, there has been proposed a method for heating the fuel-air mixture to inject a relatively lean fuel-air mixture into the cylinders of an engine. The intake manifolds are heated by the cooling water or exhaust gas from the engines or the heated air around the exhaust manifolds is cleaned through suitable filters and charged into the carburetors in order to enhance the vaporization of the fuel. When the fuel-air mixture is diluted the pollutants contained in the exhaust gases may be remarkably reduced, but the combustion becomes instable. To overcome this problem the fuel-air mixture must be sufficiently heated and the fuel must be completely vaporized. However the charging efficiency is reduced when the fuel-air mixture is elevated to a temperature between 100°C and 150°C so that the output power is reduced by about 10 – 20 %. To overcome this problem there has been proposed the so-called multi-intake-manifold system in which for each cylinder there are provided in parallel an intake manifold incorporating a fuel-air mixture heating device and an intake manifold without a fuel-air mixture heating device. At a low engine speed the fuel-air mixture is injected into the cylinders through the intake manifolds with the fuel-air heating device but in case of the high engine speed the fuel-air mixture is injected through the intake manifold without the fuel-air heating device so that the decrease in output power may be prevented. However this system has the disadvantage that the instable engine operation occurs when the engine speed is increased, that is when the charging of the fuel-air mixture is switched from the intake manifolds with the fuel-air mixing device to those without one.

One of the objects of the present invention is therefore to provide an improved fuel-air heating device which is capable of heating the fuel-air mixture without adversely affecting the charging efficiency throughout the whole range of engine speed.

Briefly stated, one of the novel features of the present invention resides in the fact that the low-volatile components of the fuel are separated from the high-volatile components after the fuel-air mixture has been heated so that the low-volatile components may be concentrated to flow close to the axis of the intake manifold, that is to flow away from the inner wall of the intake manifold, and thereafter the fuel-air mixture is cooled to a suitable temperature before it is charged into a cylinder.

The above and other objects, features and advantages of the present invention will become more apparent from the following description of the preferred embodiments thereof taken in conjunction with the accompanying drawing.

DESCRIPTION OF THE PREFERRED EMBODIMENTS

Figure 1:
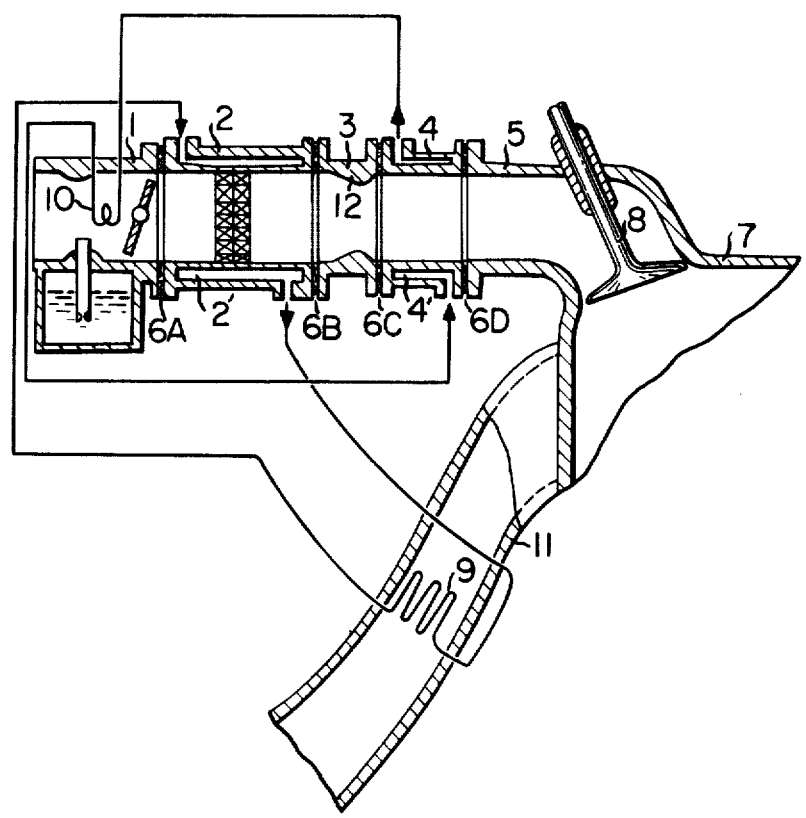
FIGS. 1 and 2 are schematic views illustrating a first and second embodiments of a fuel-air mixture heating device in accordance with the present invention.

First Embodiment, FIG. 1

Referring to FIG. 1, to a carburetor 1 is joined through a spacer 6A a heating pipe 2 having a wire netting therein. To the heating pipe is joined through a spacer 6B an insulating pipe 3 having a venturi throat 12. One end of a cooling pipe 4 is joined through a spacer 6C to the insulating pipe 3 whereas the other end is joined through a spacer 6D to an intake manifold 5 of an engine cylinder 7 having an intake valve 8.

Both the heating pipe 2 and the cooling pipe 4 have concentric intermediate spaces 2' and 4' formed between the outer and inner walls. The annular intermediate space 2' of the heating pipe 2 is hydraulically connected to an evaporator tube 9 into which is sealed water, and the intermediate space 4' of the cooling pipe 4 is also hydraulically connected a condenser tube 10 into which is sealed a coolant or liquid such as alcohol having a boiling point lower than that of water. One portion of the evaporator tube 9 is located within an exhaust manifold 11 so that the water in the evaporator tube 9 may be heated by the exhaust gas. One portion of the condenser tube 10 is located at the inlet of the carburetor 1 so that the liquid or coolant in the condenser tube 10 may be cooled when the fuel to be charged into the cylinder 7 is vaporized.

As the engine is started, the water in the evaporator tube 9 is heated by the exhaust gas and the evolved steam flows into the intermediate space 2' of the heating pipe 2 so that the low-volatile fuel component which is supplied from the carburetor 1 and is not yet vaporized may be completely vaporized by the heat transferred from the steam in the intermediate space 2' of the heating pipe 2. In general the heating value of one kilogram of fuel is of the order of 10,000 Kcal, but about 30 %, that is 3,000 Kcal is lost in the exhaust gas. The heat required for completely vaporizing the fuel is about 80 Kcal per kilogram so that the fuel may be completely vaporized in the heating pipe 2 by the heat recovered from the exhaust gas in the manner described above. The vaporized fuel is mixed with the air when the former passes through the wire netting in the heating pipe 2. In order to prevent the adhesion of the low-volatile components of the fuel which have been vaporized at high temperature to the inner walls of the cooling pipe 4 and the intake manifold 5, the venturi throat 12 is formed in the insulating pipe 3. Since the specific gravity of the low-volatile component of the fuel is generally higher than those of the high-volatile components and air, the low volatile components are forced to flow close to the axis of the cooling pipe 4 after they pass through the venturi throat 12 in the insulating pipe 3 whereas the high-volatile components and the air flow close to the inner wall.

When the low-volatile components of the fuel are heated and vaporized in the heating pipe 2 the air is also heated so that the weight of the fuel-air mixture to be charged into the cylinder 7 is reduced by an amount corresponding to the decrease in specific gravity of the heated air. For example the weight of the fuel-air mixture to be charged into the cylinder 7 at 100°C is decreased by about 15 % as compared with the case when it is charged at 20°C so that the output of the engine is accordingly decreased. In order to prevent this decrease in the output power of the engine, the fuel-air mixture is cooled in the cooling pipe 4 through the intermediate space 4' of which flows the coolant such as alcohol having a boiling point lower than that of water. Since the low-volatile components flow through the cooling pipe 4 close to the axis thereof as described above, that is away from the inner wall and because the cooling time is relatively short, they are not condensed again even when the fuel-air mixture is cooled down to 20°C. In this case the high-volatile components are prevented from adhering to the inner wall of the cooling pipe 4. Thus the super-saturated fuel-air mixture is charged into the cylinder 7. Since the specific gravity of the fuel-air mixture is increased, the charging efficiency is increased and the decrease in output power is prevented The coolant which is vaporized in the cooling pipe 4 by the heat derived form the gas-fuel mixture is returned to the portion of the condenser tube 10 which is located at the inlet of the carbureter 1 and is condensed to a temperature lower than that of the sucked air as the fuel is vaporized in the carbureter 1.

From the foregoing description, according to the present invention the fuel may be completely evaporated and the decrease in charging efficiency due to the vaporization of the fuel may be prevented so that the decrease in output power of the engines may be prevented and the pollutants included in the exhaust gas may be reduced.

It should be noted that the exhaust gas may be branched to circulate through the heating pipe 2 instead of water and that the coolant in the cooling pipe 4 and the condenser tube 10 may be circulated by a pump.

Figure 2:
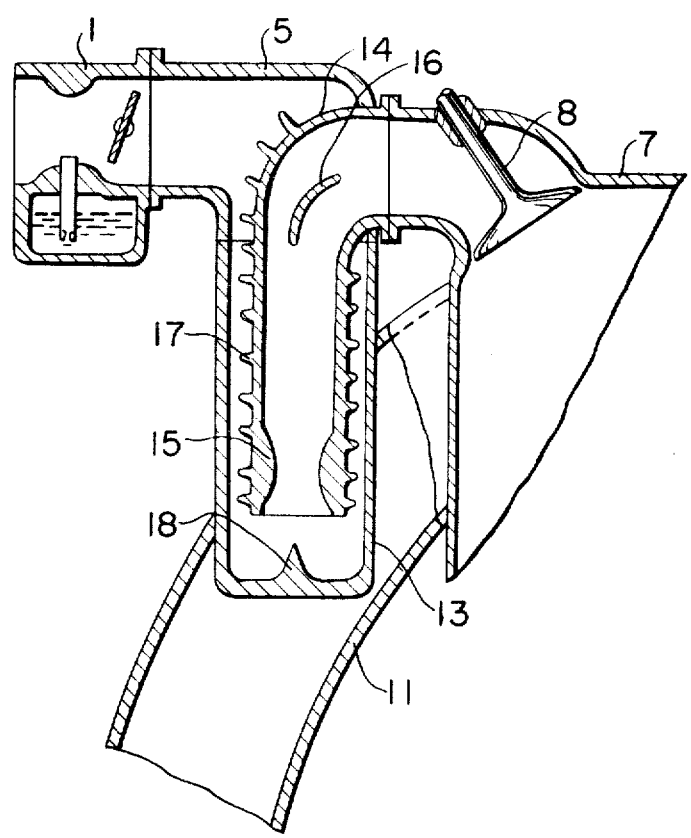

Second Embodiment, FIG. 2

Referring to FIG. 2 to the carburetor 1 is joined one end of the intake manifold 5 the other end of which is joined to a heating pipe 13 a part of which is disposed within the exhaust manifold 11. A cooling pipe 14 which is disposed within the heating pipe 13 coaxially thereof is joined to the cylinder 7 through the intake valve 8. It is seen that the fuel-air mixture flows downwardly in the heating pipe 13 and then upwardly in the cooling pipe 14 toward the cylinder 7. At the bottom of the heating pipe 13 is disposed a conical projection 18, a venturi throat 15 is formed at the inlet of the cooling pipe 14, a guide vane 16 is formed within the cooling pipe 14 at its bent portion, and a plurality of cooling fins 17 are formed on the outer wall of the cooling pipe 14 in order to facilitate the heat transfer.

When the fuel supplied from the carburetor 1 flows downwardly in the heating pipe 13, it is heated by the fuel-air mixture flowing upwardly in the cooling pipe 14 which mixture has been heated by the exhaust gas. Thus the high volatile components of the fuel are completely vaporized and the fuel-air mixture flowing through the cooling pipe 14 is cooled and then charged into the cylinder 7. The low-volatile components of the fuel may be also completely vaporized as they approach the bottom of the heating pipe 13 which is exposed to the exhaust gas. Therefore the fuel is completely vaporized when it flows into the cooling pipe 14 from the heating pipe 13. The conical projection 18 formed at the bottom of the heating pipe 13 serves to redirect or reverse the fuel-air flow into the cooling pipe 14 from the bottom of the heating pipe 13. As the fuel-air mixture flows along the conical projection 18 and through the venturi throat 15 formed at the inlet of the cooling pipe 14, the low-volatile components which have a relatively great specific gravity are forced to flow close to the axis of the cooling pipe 14, that is to flow away from the inner wall thereof as is the case of the first embodiment so that they may be effectively prevented from being condensed and adhering to the inner wall of the cooling pipe 14 at the inlet thereof. Thus the supersaturated fuel-air mixture may be injected into the cylinder 7. The guide vane 16 also serves to prevent the fuel-air mixture from forming secondary flows or vortexes at the bent portion of the cooling pipe 14 so that the low-volatile components may be confined to flow close to the axis of the cooling pipe 14.

As described above, the completely vaporized fuel may be injected into the cylinder 7 without decreasing the charging efficiency so that a desired output power may be derived from the engine from a relatively lean fuel-air mixture. Thus the conventional air-fuel ratio limit of the order of from 18 to 19 may be further diluted to 22 to 24 without causing the decrease in output power of the engine. Furthermore the concentration of the pollutants contained in the exhaust gas may be remarkably reduced.

Figure 3:
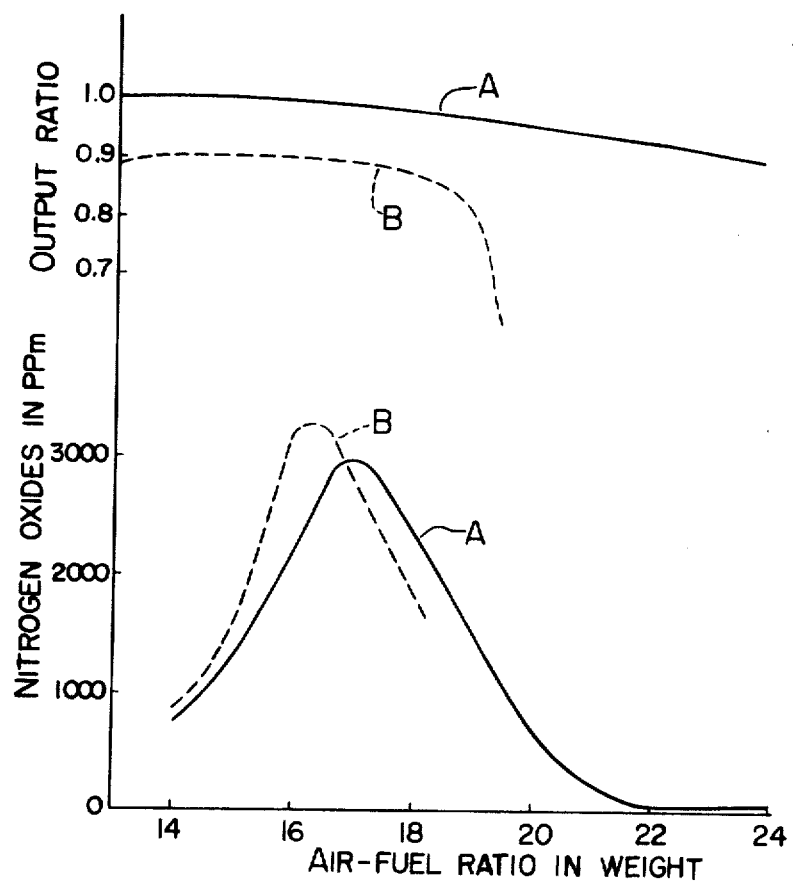
FIG. 3 is a view used to explain the advantages of the present invention over the prior art devices.

FIG. 3 shows the relations between the air-fuel ratio and the output ratio and the nitrogen oxide ($NO_x$) connectration in ppm. The solid lines A show the characteristic curves of the engine incorporating with the fuel-air mixture heating device in accordance with the present invention while the broken lines B, those of the engine equipped with the conventional fuel-air mixture heating device. Even though not shown in the graph in FIG. 3, the experiments conducted by the inventor showed also the remarkable reduction of hydrocarbons and carbon monoxide in the exhaust gas especially when the air-fuel ratio is about 20.

As compared with the prior art multi-intake-manifold system the present invention has the advantages that the variation in engine speed may be minimized, the smooth acceleration may be effected and the fuel consumption may be minimized.

What is claimed is:

1. A fuel-air mixture treating device adapted to be interposed between a carburetor and an intake manifold of an internal combustion engine comprising:
   a. fuel-air mixture heating means disposed downstream of said carburetor,
   b. fuel flow control means disposed downstream of said fuel-air mixture heating means for forcing vaporized low-volatile components of fuel heated and vaporized by said fuel-air mixture heating means to concentrate toward and flow close to the axis of said fuel-air mixture heating device and said intake manifold, and
   c. cooling means disposed downstream of said fuel flow control means for cooling the fuel-air mixture flowing toward said intake manifold using a cooling medium which does not directly contact the fuel-air mixture.

2. A fuel-air mixture treating device adapted to be interposed between a carburetor and an intake manifold of an internal-combustion engine comprising:
   a. fuel-air mixture heating means disposed downstream of said carburetor,
   b. fuel flow control means disposed downstream of said fuel-air mixture heating means for forcing vaporized low-volatile components of fuel heated and vaporized by said fuel-air mixture heating means to concentrate toward and flow close to the axis of said fuel-air mixture heating device and said intake manifold, and c. cooling means disposed downstream of said fuel flow control means for cooling the fuel-air mixture flowing toward said intake manifold, wherein d. said fuel-air mixture heating means comprises:

a heating pipe having a hollow intermediate space formed between outer and inner walls thereof;

an evaporator tube which is hydraulically connected to said hollow intermediate space of said heating pipe and at least one portion of which is disposed in an exhaust manifold of said engine so that the fuel may be heated and completely vaporized in said heating pipe by the heat dissipated from liquid which is sealed in said hollow intermediate space and said evaporator tube and heated by the exhaust gas flowing through said exhaust manifold and circulated through said hollow intermediate space and said evaporator tube;

e. said control means comprises:

an insulating pipe having a venturi throat formed therein so that said vaporized low-volatile components of the fuel may be forced to concentrate toward and flow close to the axis of said intake manifold; and f. said cooling means comprises:

a cooling pipe having a hollow intermediate space formed between the outer and inner walls coaxially thereof, and a condenser tube which is hydraulically connected to said hollow intermediate space of said cooling pipe and at least one portion of which is disposed at a venturi throat in said carburetor so that the fuel-air mixture may be cooled by a coolant which is sealed into said condenser tube and said hollow intermediate space of said cooling pipe.

3. A fuel-air mixture treating device adapted to be interposed between a carburetor and an intake manifold of an internal-combustion engine comprising:

a. fuel-air mixture heating means disposed downstream of said carburetor, b. fuel flow control means disposed downstream of said fuel-air mixture heating means for forcing vaporized low-volatile components of fuel heated and vaporized by said fuel-air mixture heating means to concentrate toward and flow close to the axis of said fuel-air mixture heating device and said intake manifold, and c. cooling means disposed downstream of said fuel flow control means for cooling the fuel-air mixture flowing toward said intake manifold, wherein the fuel-air mixture supplied from said carburetor through said intake manifold is forced to flow through a heating pipe at least one portion of which is in direct contact with the wall of an exhaust manifold of said engine and in which is formed a cone-shaped projection for reversing the flow of the fuel-air mixture; and wherein a cooling pipe which has a venturi throat at the inlet thereof in opposed relation with said cone-shaped projection in said heating pipe is disposed within said heating pipe coaxially thereof so that the heat-exchange between the fuel-air mixtures flowing through said heating and cooling pipes in the opposite directions respectively may be effected through the wall of said cooling pipe.

4. A fuel-air mixture treating device adapted to be interposed between a carburetor and an intake manifold of an internal-combustion engine comprising:

a. fuel-air mixture heating means adapted to be disposed downstream of said carburetor in use, b. fuel flow control means disposed downstream of said fuel-air mixture heating means in use for forcing vaporized low-volatile components of fuel heated and vaporized by said fuel-air mixture heating means toward a flow path which has low heat exchange characteristics relative to the flow path of the remainder of said fuel-air mixture, and c. cooling means disposed downstream of said fuel flow control means in use for cooling the fuel-air mixture flowing from said fuel flow control means using a cooling medium which does not directly contact the fuel-air mixture.

5. A fuel-air mixture treating device as defined in claim 4, wherein a. said fuel-air mixture heating means comprises:

a heating pipe through which said fuel-air mixture flows having a hollow intermediate space formed between outer and inner walls thereof, and heat supply means for supplying relatively hot heat exchange fluid to said space.

6. A fuel-air mixture treating device adapted to be interposed between a carburetor and an intake manifold of an internal-combustion engine comprising:

a. fuel-air mixture heating means adapted to be disposed downstream of said carburetor in use, b. fuel flow control means disposed downstream of said fuel-air mixture heating means in use for forcing vaporized low-volatile components of fuel heated and vaporized by said fuel-air mixture heating means toward a flow path which has low heat exchange characteristics relative to the flow path of the remainder of said fuel-air mixture, and c. cooling means disposed downstream of said fuel flow control means in use for cooling the fuel-air mixture flowing from said fuel flow control means, wherein d. said fuel-air mixture heating means comprises:

a heating pipe through which said fuel-air mixture flows having a hollow intermediate space formed between outer and inner walls thereof, and heat supply means for supplying relatively hot heat exchange fluid to said space, and wherein e. said heat supply means comprises an evaporator tube which is hydraulically connected to said hollow intermediate space of said heating pipe and at least one portion of which is disposed in an exhaust manifold of said engine so that the fuel may be heated and completely vaporized in said heating pipe by the heat dissipated from liquid which is sealed in said hollow intermediate space and said evaporator tube and heated by the exhaust gas flowing through said exhaust manifold and circulated through said hollow intermediate space.

7. A fuel-air mixture treating device according to claim 4, wherein said fuel flow control means comprises an insulating pipe having a venturi throat formed therein so that said vaporized low-volatile components of the fuel may be forced to concentrate toward and flow close to the axis of said intake manifold.

8. A fuel-air mixture treating device according to claim 5, wherein said fuel flow control means comprises an insulating pipe having a venturi throat formed therein so that said vaporized low-volatile components of the fuel may be forced to concentrate toward and flow close to the axis of said intake manifold.

9. A fuel-air mixture treating device according to claim 8, wherein said cooling means comprises a cooling pipe having a hollow intermediate space formed between outer and inner walls, thereof and coolant supply means for supplying relatively cool heat exchange fluid to said hollow intermediate space.

10. A fuel-air mixture treating device adapted to be interposed between a carburetor and an intake manifold of an internal-combustion engine comprising:
   a. fuel-air mixture heating means adapted to be disposed downstream of said carburetor in use,
   b. fuel flow control means disposed downstream of said fuel-air mixture heating means in use for forcing vaporized low-volatile components of fuel heated and vaporized by said fuel-air mixture heating means toward a flow path which has low heat exchange characteristics relative to the flow path of the remainder of said fuel-air mixture, and
   c. cooling means disposed downstream of said fuel flow control means in use for cooling the fuel-air mixture flowing from said fuel flow control means, wherein said fuel-air mixture heating means comprises:
      a heating pipe through which said fuel-air mixture flows having a hollow intermediate space formed between outer and inner walls thereof, and
      heat supply means for supplying relatively hot heat exchange fluid to said space,
   wherein said fuel flow control means comprises an insulating pipe having a venturi throat formed therein so that said vaporized low-volatile components of the fuel may be forced to concentrate toward and flow close to the axis of said intake manifold,
   wherein said cooling means comprises:
      a cooling pipe having a hollow intermediate space formed between outer and inner walls thereof, and
      coolant supply means for supplying relatively cool indirect heat exchange fluid to said hollow intermediate space, and
   wherein said coolant supply means comprises a condenser tube which is hydraulically connected to said hollow intermediate space of said cooling pipe and at least one portion of which is disposed at a venturi throat in said carburetor so that the fuel-air mixture may be cooled by a coolant which is sealed into said condenser tube and said hollow intermediate space of said cooling pipe.

11. A fuel-air mixture treating device adapted to be interposed between a carburetor and an intake manifold of an internal-combustion engine comprising:
   a. fuel-air mixture heating means adapted to be disposed downstream of said carburetor in use,
   b. fuel flow control means disposed downstream of said fuel-air mixture heating means in use for forcing vaporized low-volatile components of fuel heated and vaporized by said fuel-air mixture heating means toward a flow path which has low heat exchange characteristics relative to the flow path of the remainder of said fuel-air mixture, and
   c. cooling means disposed downstream of said fuel flow control means in use for cooling the fuel-air mixture flowing from said fuel flow control means,
   d. a heating pipe at least one portion of which is in direct contact with the wall of an exhaust manifold of said engine,
   e. flow reversing means located within said heating pipe for reversing the flow of the fuel-air mixture, and f. a cooling pipe containing said fuel flow control means therein disposed within said heating pipe coaxially thereof so that the heat exchange between the fuel-air mixtures flowing through said heating and cooling pipes in the opposite directions respectively may be effected through the wall of said cooling pipe.

12. A fuel-air mixture treating device according to claim 11, wherein said fuel flow control means comprises a venturi throat at the inlet of the cooling pipe in opposed relation with said flow reversing means.

13. A fuel-air mixture treating device according to claim 12, wherein said flow reversing means comprises a cone-shaped projection.

* * * * *

UNITED STATES PATENT OFFICE
CERTIFICATE OF CORRECTION

Patent No. 3,892,211  Dated July 1, 1975

Inventor(s) Yoshishige OYAMA

It is certified that error appears in the above-identified patent and that said Letters Patent are hereby corrected as shown below:

Title page, insert the following:

[30]    Foreign Application Priority Data

December 22, 1971    Japan............46-103686

*Signed and Sealed this*

*twenty-fifth* Day of *November 1975*

[SEAL]

*Attest:*

RUTH C. MASON  
*Attesting Officer*

C. MARSHALL DANN  
*Commissioner of Patents and Trademarks*